UNITED STATES PATENT OFFICE.

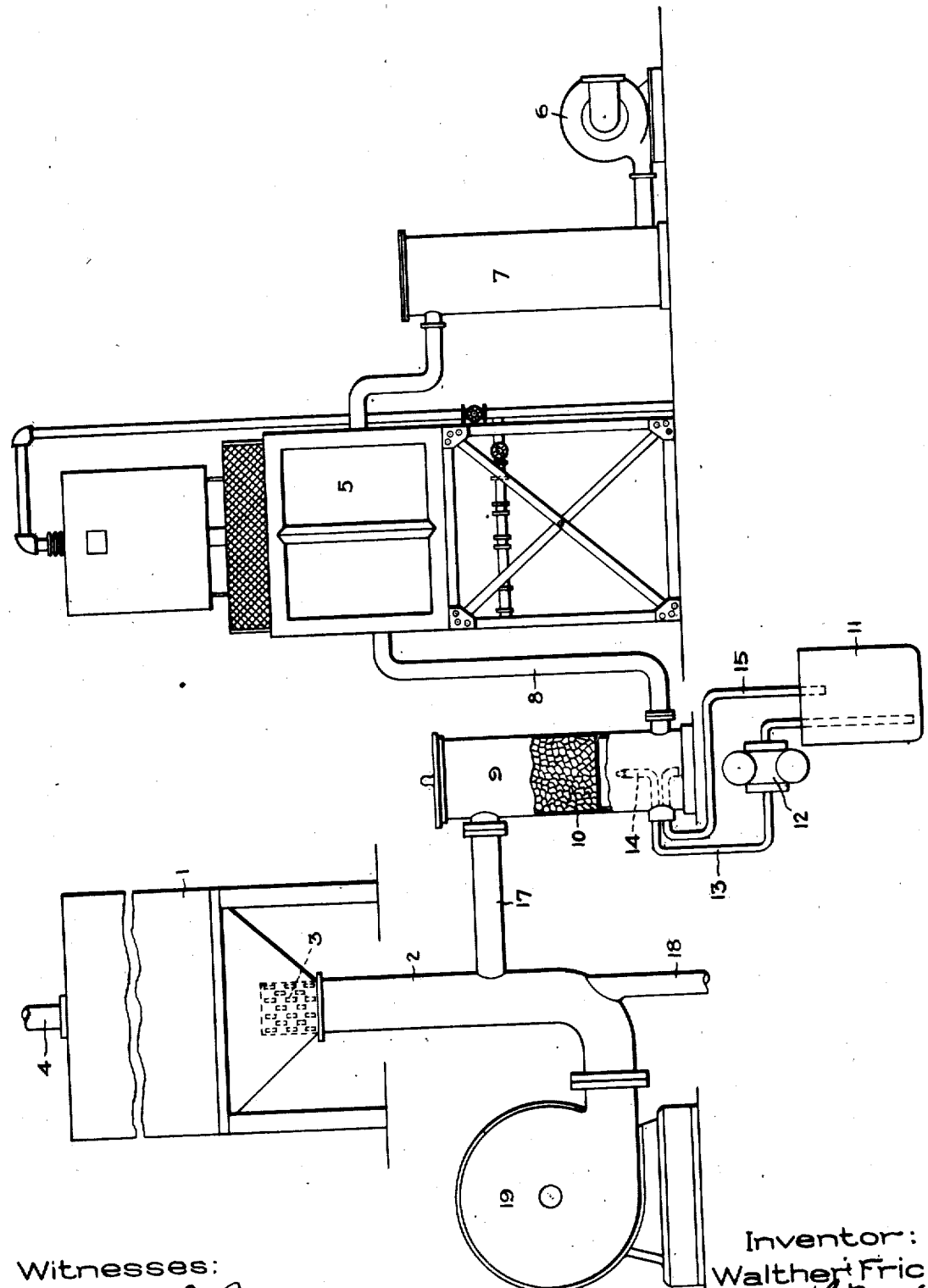

WALTHER FRICK, OF HÖCHST-ON-THE-MAIN, GERMANY, ASSIGNOR TO GENERAL ELECTRIC COMPANY, A CORPORATION OF NEW YORK.

METHOD OF DEODORIZING GRAIN.

1,267,204.  Specification of Letters Patent.  Patented May 21, 1918.

Application filed January 8, 1915. Serial No. 1,262.

*To all whom it may concern:*

Be it known that I, WALTHER FRICK, a subject of the King of Wurttemberg at Höchst-on-the-Main, Germany, have invented certain new and useful Improvements in Methods of Deodorizing Grain, of which the following is a specification.

My invention has reference to a method for the treatment of grain.

As is well known, grain that has become wet acquires, before any change is noticeable on the exterior of the kernels, a musty odor. In this condition the grain is useless for feeding purposes.

In accordance with my invention, the grain which is to be treated is exposed to the action of ozone and steam, which removes the disagreeable odor so completely that the grain is again fit for use and is readily eaten by animals. At the same time its color is improved on account of the bleeching effect of the ozone.

The slight amount of nitrous oxid which always appears when ozone is generated from atmospheric air produces a disagreeably sour odor in grain. When the ozone is obtained from the air, therefore, it must first be freed from this admixture of nitrous oxid, preferably by washing with a dilute alkaline solution such as caustic potash or soda, and since traces of the caustic soda must be prevented from getting into the grain, a suitable washing apparatus is in this case necessary.

The single figure of the drawing is a side view showing one embodiment of my invention.

Referring to the drawing, 1 is a bin or container of usual construction for the grain. The upper end of a tube 2 projects through the bottom of the container and is provided with a number of openings 3 through which the gases from the tube may escape into the container and come in contact with the grain. A pipe 4 is provided, preferably at the top of the bin, for the escape of the gases that have passed through the grain. An ozone generator of usual design is indicated by the reference numeral 5. When the ozone is obtained from the air a blower 6 is provided which first forces the air through a drier 7 to the ozone generator. The ozone from the generator is led by a pipe 8 to a scrubber or washer 9 in which is located a layer 10 of suitable indifferent absorbent material which is supported on a perforated plate within the scrubbing chamber. The washing fluid, which may be a dilute solution of caustic soda or other alkali, is contained in the vessel 11, from which the pump 12 forces the fluid through a pipe 13 to a nozzle 14 beneath the absorbent material in the chamber, the nozzle being so located as to direct a stream of the washing fluid against the absorbent material. The washing fluid is returned to the vessel 11 by a pipe 15. The traces of alkaline solution may conveniently be removed from the ozone by a layer of the same kind of absorbent material as that used for washing the ozone with the alkaline solution. The material that is used for this purpose is impregnated or wet with water and is placed above the absorbent material which receives the alkaline washing solution. The ozone thus freed from nitrous oxid passes through the pipe 17 into the pipe 2, where it is mixed with steam supplied by a pipe 18. Another fan 19 is provided for furnishing additional air to the steam and ozone mixture, and it is obvious that the concentration of the ozone may readily be regulated by suitably proportioning the air supplied by the fans 6 and 19.

When pure oxygen is used for the production of ozone, no nitrous oxid vapors are formed, and the washing apparatus above described will, of course, be unnecessary.

It is desirable after the grain has been treated with ozone to again treat it with fresh air.

In accordance with the provisions of the patent statutes, I have described the principle of operation of my invention, together with the apparatus which I now consider to represent the best embodiment thereof for performing my invented method; but I desire to have it understood that the apparatus shown is only illustrative, and that the invention can be carried out by other means.

What I claim as new and desire to secure by Letters Patent of the United States, is,—

The method of recovering grain which has become wet and musty which consists in subjecting the same to the action of a mixture of ozone and steam, and then treating the grain with fresh air.

In witness whereof, I have hereunto set my hand this 11th day of January, 1915.

WALTHER FRICK.

Witnesses:
ERNEST ENTENMANN,
FRIDA KLAIBER.